United States Patent [19]
Brown

[11] Patent Number: 5,964,145
[45] Date of Patent: Oct. 12, 1999

[54] GRIDDLE

[75] Inventor: Charles A. Brown, Dallas, Pa.

[73] Assignee: Legion Industries, Inc., Dallas, Pa.

[21] Appl. No.: 09/018,631

[22] Filed: Feb. 4, 1998

[51] Int. Cl.[6] .................................................. A47J 37/10
[52] U.S. Cl. ............................. 99/422; 99/447; 99/449; 126/39 J; 126/390; 219/445; 219/462
[58] Field of Search .............................. 99/422, 423, 424, 99/425, 447, 449; 126/394, 39 N, 39 J, 41 R, 390; 219/459, 462, 530, 445

[56] References Cited

U.S. PATENT DOCUMENTS

| | | | |
|---|---|---|---|
| 1,983,118 | 12/1934 | Bourque | 219/431 |
| 2,009,791 | 7/1935 | Shroyer | 99/377 |
| 3,432,642 | 3/1969 | Löhr et al. | |
| 3,592,668 | 7/1971 | Denk | |
| 3,895,216 | 7/1975 | Hurko | 219/462 |
| 3,964,378 | 6/1976 | Dunkelman | 99/425 |
| 4,138,606 | 2/1979 | Brown | 219/442 |
| 4,150,280 | 4/1979 | Hurko | 219/461 |
| 5,413,032 | 5/1995 | Bruno et al. | 99/422 X |
| 5,467,695 | 11/1995 | Keller et al. | 99/422 |
| 5,553,531 | 9/1996 | Brown | 99/340 |
| 5,676,043 | 10/1997 | Best | 99/422 X |

*Primary Examiner*—Reginald L. Alexander
*Attorney, Agent, or Firm*—Caesar, Rivise, Bernstein, Cohen & Pokotilow, Ltd.

[57] ABSTRACT

A griddle adapted for use in the food service industry. The griddle comprises a stainless steel griddle plate and a plurality of copper plates held against the underside of the griddle plate. High temperature grease is placed between the adjacent surfaces of the stainless steel plates and copper plates. The copper plates are held in place by leaf springs. Suitable heating devices, such as gas burners or electric heater bars, heat the griddle. When there is a differential in temperature between the stainless steel plate and the copper plates, the copper plates can move relative to the stainless steel plate. The movement is facilitated by the use of high temperature grease. The high temperature grease also provides efficient heat transfer between the copper plates and the stainless steel plate.

10 Claims, 8 Drawing Sheets

GRIDDLE

BACKGROUND OF THE INVENTION

This invention relates to a griddle, in general, and, more particularly, to a griddle that is particularly adapted for use in the food service industry.

The food service industry involves the preparation of substantial quantities of food for consumption by a large number of people. Thus, institutions involved in the food service industry include cafeterias, hospitals, colleges, prisons, restaurants, airlines, etc.

My prior U.S. Pat. No. 5,553,531, the disclosure of which is incorporated by reference herein, discloses a multi-functional cooking device that combines a steamer, skillet, griddle, fryer, kettle, holding cabinet and oven into a single unit. The device of this invention is a griddle which can be used in the multi-functional cooking device of my prior patent, or can be used as a free-standing griddle wherever food is prepared for consumption by the public. It can be used in any environment in the food service industry and the specific environment or device in which it is used forms no part of this invention.

In my prior patent, the griddle has a griddle plate formed from stainless steel, or in a modified embodiment, the stainless steel can be clad with another heat conductive metal, such as aluminum, copper or steel. The griddle plate used in the commercial embodiment of the invention disclosed in my prior patent consisted of a stainless steel plate to which was clad carbon steel. It is known to clad household pots and pans with copper, in order to increase heat transfer. However, it is not believed that stainless steel has ever been clad with copper to form a griddle for commercial purposes.

This invention recognizes that the combination of copper and stainless steel provides significant heat transfer improvement, both laterally and transversely, over the stainless steel plate clad with carbon steel. The coefficient of thermal conductivity for copper is 226 Btu/sq. ft./ft./hr. ° F. vs. carbon steel of 27 Btu/sq. ft./ft./hr. ° F. Aluminum, although better than carbon steel, is not nearly as good as copper with a coefficient of thermal conductivity of 90 Btu/sq. ft./ft./hr. ° F. Aluminum also has the added disadvantage of its position in the galvanic series relative to stainless steel.

A comparison of the pertinent thermal properties of the foregoing metals is set forth in the following chart:

| Material | Density lb./cu. in. | Coefficient of Thermal Exp. | Thermal Conductivity | Specific Heat |
|---|---|---|---|---|
| Copper CDA 110 | 0.323 | 9.8 | 226.0 | 0.092 |
| Aluminum 6061-T6 | 0.098 | 13.5 | 90.0 | 0.230 |
| Carbon Steel C1020 | 0.283 | 6.3 | 27.0 | 0.100 |
| Stainless Steel 304/316 | 0.290 | 9.9 | 9.4 | 0.120 |

Thermal Expansion per ° F. × 10(−6), temperature range 77° F.–572° F.
Thermal Conductivity Btu/sq. ft./ft./hr. ° F. @ 68° F.

As seen in the foregoing chart, the coefficients of thermal expansion for copper and stainless steel are much closer to each other than carbon steel is to stainless steel. Significant bowing of the bonded clad plate occurs as the temperature rises, with a 57% differential in the coefficients of thermal expansion between stainless steel and carbon steel. Aluminum, with a coefficient of thermal expansion that is 36% greater than that of stainless steel, will also cause bowing when aluminum is clad to stainless steel.

In the griddle of this invention, copper is used with stainless steel in order to take advantage of the heat transfer advantages of the copper, without any of the problems incumbent in cladding the stainless steel with copper. Instead, the copper is clamped against the stainless steel, without being bonded to the stainless steel. The copper layers are lubricated with a high temperature grease, so that they can move relative to each other and relative to the stainless steel. The net effect is significantly reduced bowing and potential warping of the stainless steel, as compared to clad plate.

One of the advantages of having the copper held against the stainless steel, but not bonded to the stainless steel, is that the griddle surface and sides can be formed from a sheet of stainless steel, with welds vertically in the four corners. This method eliminates welds to stainless steel sheet metal sides around the bottom of the clad plate. Failures of welds around the bottom of the clad plate occur due to thermal stresses at elevated temperatures, as described above. A significant advantage of the new design is the ability of the assembled pan to withstand sudden changes in temperature, e.g., cold water sprayed into a hot pan @400° F., without the concern of welds failing.

Another advantage of utilizing copper for its thermal conductivity as opposed to aluminum and carbon steel, is that stainless steel and copper are much closer together in the galvanic series than either aluminum or carbon steel is relative to stainless steel. This becomes important if moisture is present, since corrosion can start at the interface of the assembly. This can result in galvanic corrosion.

The combination of the copper and stainless steel in this invention results in significantly greater heat distribution laterally, as compared with carbon steel. The heat distribution utilizing the copper is 3.3 to 6.3 times more effective than that which results from using the carbon steel. The composite copper thickness of 0.188" is equivalent to 1.569" carbon steel. Typical clad plate utilized in the industry employs between 0.250" and 0.500" carbon steel.

There is significantly increased conductivity (60%) through the composite copper and stainless steel, as compared to the stainless steel clad with carbon steel. Additionally, the composite copper/stainless steel results in faster recovery when heat is called for.

More accurate temperature readings are obtained with the thermobulb device attached to the copper. There is reduced bowing and warping, and weld failures are eliminated, by using the copper composite of this invention. Additionally, a smoother finish can be obtained for the stainless steel griddle surface, since the grinding and polishing of bottom welds is eliminated. This makes it easier to clean the griddle surface, and comply with federal, state and local food codes.

The draw-off for the grease on the griddle can be welded and blended into the bottom radius of the pan to allow easier, more complete draining when the pan is tilted. With a welded clad plate, the draw-off must be placed above the welds of the plate in order to provide strong welds. This placement can hinder complete draining.

SUMMARY OF THE INVENTION

A griddle comprising a griddle plate formed from stainless steel and copper plates held against the underside of the griddle plate. The copper plates are resiliently held in place, and can move laterally and transversely relative to the griddle plate. High temperature grease is placed on the copper plates, to facilitate movement and heat transfer across the plates.

DESCRIPTION OF THE DRAWINGS

Many of the attendant advantages of this invention will become readily appreciated as the same becomes better understood by reference to the following detailed description, when considered in connection with the accompanying drawings, wherein.

DETAILED DESCRIPTION OF THE PREFERRED EMBODIMENT

Figure 1:
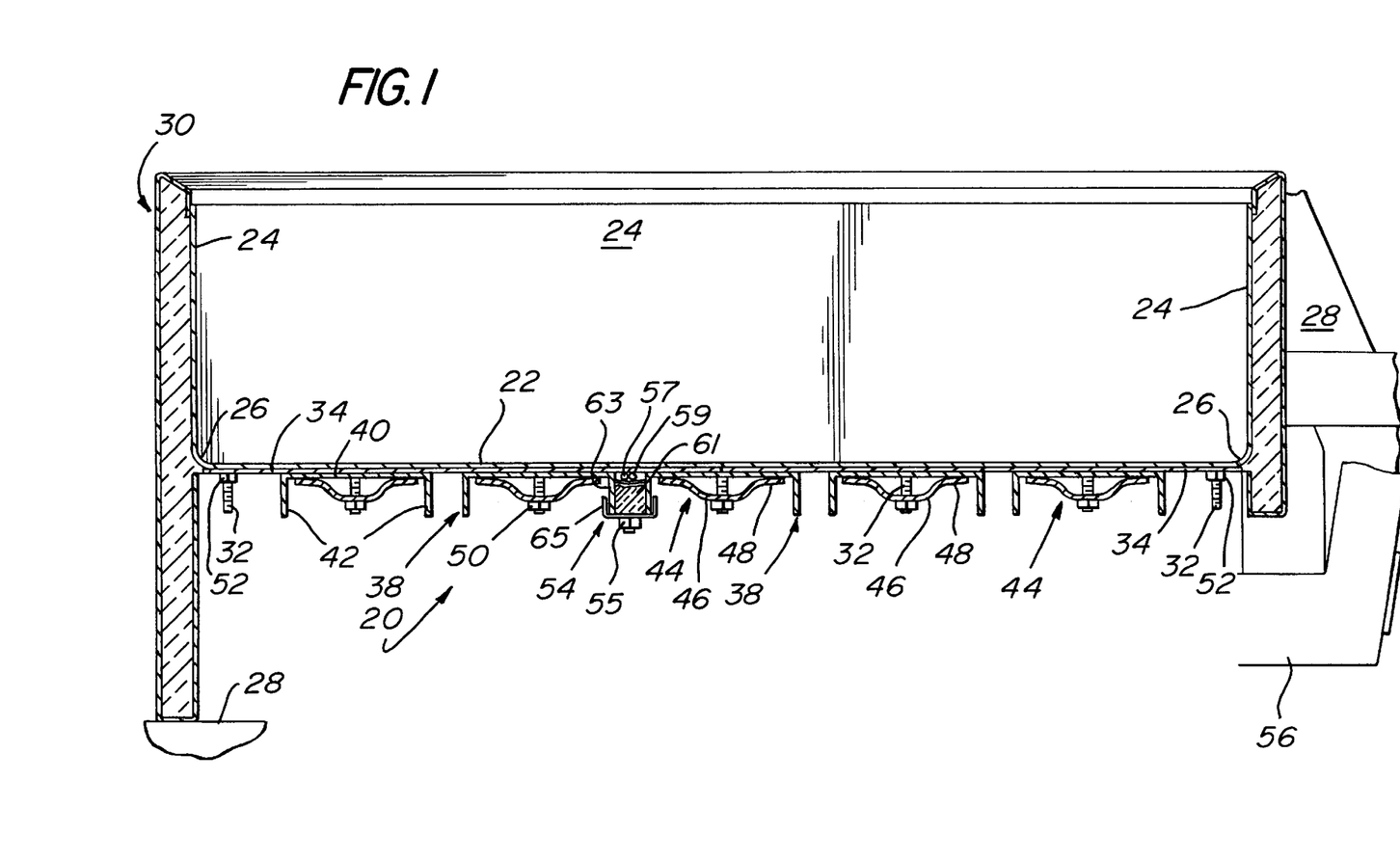
FIG. 1 is a sectional view of a first embodiment of the griddle of this invention.

Referring now in greater detail to the various figures of the drawing, wherein like reference characters refer to like parts, a griddle embodying the present invention is generally shown at 20 in FIG. 1. Device 20 comprises a griddle plate 22 having upstanding side walls 24. The griddle plate and side walls are formed from a single sheet of stainless steel, thereby forming an arcuate bend 26 between plate 22 and each wall 24. After the bends are made, each wall 24 is secured to its adjacent wall 24 by a vertically-extending weld.

The griddle plate 22 and its associated walls 24 are supported on a frame, a portion of which is shown at 28 in FIG. 1. The actual frame used forms no part of this invention. However, the griddle is adapted to be used in the cooking device shown in U.S. Pat. No. 5,553,531, and the frame shown in that patent can be used with the griddle of this invention. When used with the device shown in U.S. Pat. No. 5,553,531, the griddle will be enclosed in insulated housing 30.

Figure 2:
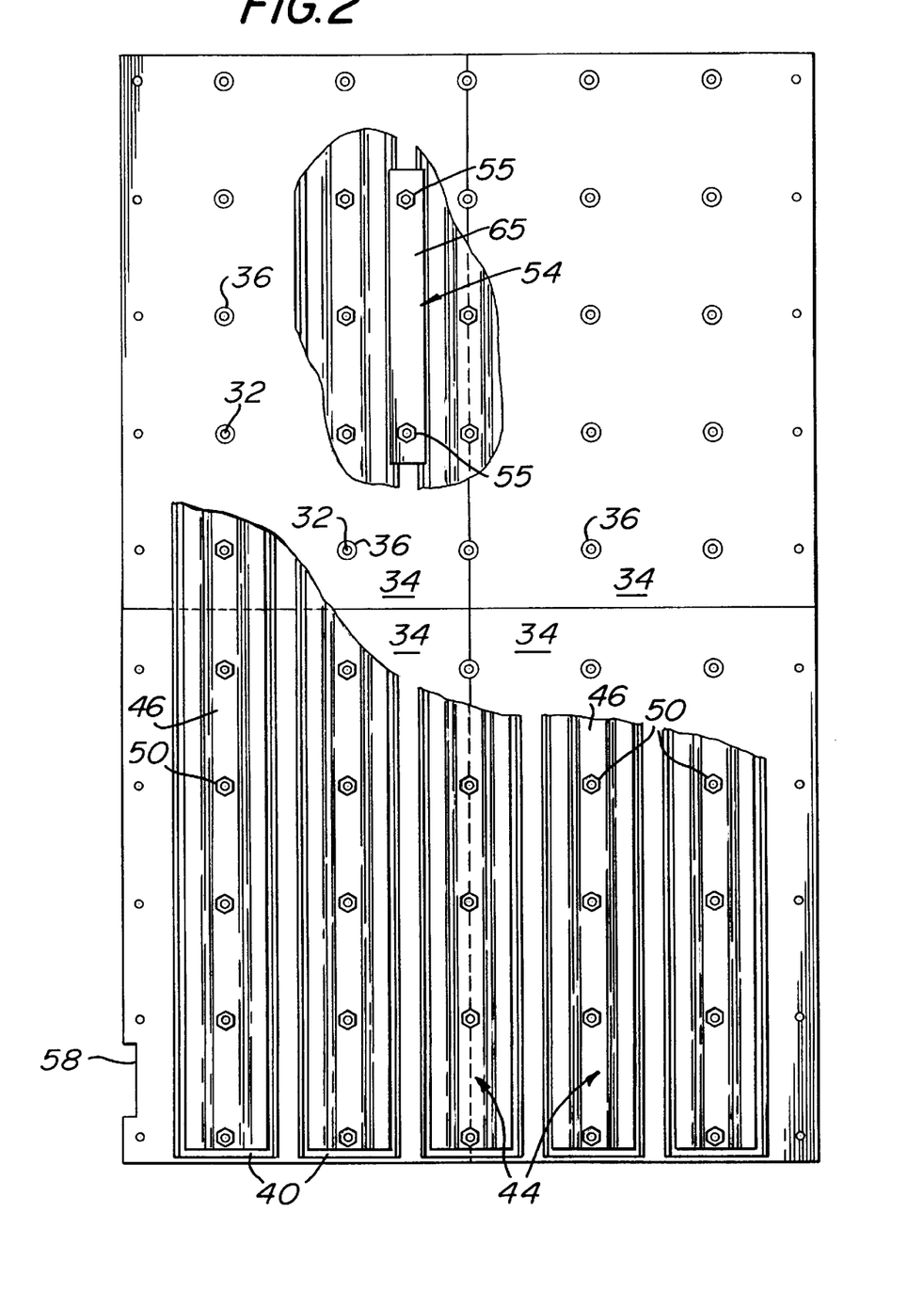
FIG. 2 is a bottom plan view of the griddle of FIG. 1.

As seen in FIG. 1, a plurality of threaded rods 32 are secured to the underside of plate 22, as by welding. As seen in FIG. 2, the rods 32 are spaced from each other both laterally and transversely. As further seen in FIG. 2, they are arranged in parallel rows, both laterally and transversely. Four copper plates 34 having openings 36, are placed against the underside of griddle plate 22, with threaded rods 32 passing through the openings. As seen in FIG. 2, the openings are in parallel rows, both laterally and transversely, and are aligned with the threaded rods when the copper plates are in place.

U-shaped bars 38 extend across virtually the entire width of plate 22. As seen in FIG. 1, U-shaped bars 38 include top plate 40 and downwardly projecting legs 42. The U-shaped bars have spaced openings therein, through which the threaded rods 32 project (FIG. 1). U-shaped bars 38 are formed from copper.

Leaf springs 44 are positioned below and within U-shaped bars 38. The leaf springs comprise a lower portion 46 which flares into lips 48. The lower portion has a plurality of openings therein, which have the same spacing as threaded rods 32. The threaded rods pass through the openings, and the leaf springs are secured in place by nuts 50. The tightening of the nuts 50 brings pressure on leaf springs 44, which in turn hold the U-shaped bars 38 and plates 34 in place. The outer edges of plates 34 are held in place by nuts 52 (FIG. 1). There are no leaf springs associates with the outermost threaded rods 32. The leaf springs are formed from copper.

As seen in FIGS. 1 and 2, a thermobulb assembly 54 is secured between an adjacent pair of legs 42 by nuts 55. Thermobulb assemblies are well known in the art, and any thermobulb assembly can be used in carrying out this invention. The purpose of the thermobulb assembly is to control the temperature of the griddle plate.

In the embodiment of the thermobulb assembly 54 shown in FIG. 1, the assembly includes a primary thermostat 57 and a high-limit thermostat 59. The thermostats rest on insulation 61, which is housed within clamp 63. An outer, U-shaped clamp 65 holds the insulation 61 in place. The outer clamp 65 is in turn held in place by nuts 55 (see also FIG. 2).

The details and circuitry for controlling the temperature of the griddle plate, through the use of thermostats 57 and 59, are the same as those described in U.S. Pat. No. 5,553,531, and the controls are of a type well known in the art.

The embodiment of the invention shown in FIGS. 1 and 2 is adapted for use with a gas heater. In assembling the griddle, a coating of high temperature grease is placed on all surfaces that are contiguous. Thus, there is high temperature grease between the copper plates 34 and the underside of griddle plate 22. High temperature grease is also placed between the tops 40 of U-shaped bars 38 and the undersides of plates 34. High temperature grease is well known in the art, and any high temperature grease known to the art can be used in carrying out this invention. The U-shaped bars 38 are rigid, and are formed from copper.

When the copper-stainless steel composite griddle plate is heated, any thermal expansion of the copper plates 34 and U-shaped bars 38 which is different from the thermal expansion of the stainless steel plate 22 will not result in gapping or bowing of the stainless steel plate. Instead, the copper plates and bars can move relative to the stainless steel plate, and this movement is facilitated by the high temperature grease. Since the copper plates 34 will remain in physical contact with the stainless steel plates, through the intermediate high temperature grease, efficient heat transfer will be maintained.

The gas burner to heat the griddle plate 22 is mounted on frame 28, below the griddle plate. Gas burners for heating commercial griddles are well known in the art, and any gas burner known to the art can be used in carrying out this invention. A flue 56 is used for removing the combustion products from the gas burner.

The U-shaped bars 38 serve a number of functions in this invention. One function is to provide an increased surface area and a larger heat sink to increase the efficiency of heat transfer from the burning gas to the stainless steel griddle plate 22. Another function is to provide transverse heat conduction perpendicular to the gas heater to provide even heat distribution across the complete griddle surface. The U-shaped bars also provide rigidity to the stainless steel plate 22.

The copper plates 34 are placed over the U-shaped bars or channels to allow the heat to conduct evenly under and between the channels. The channels also provide flexibility for expansion and contraction with significant temperature differences between the copper plates and the griddle plate. In this connection, it should be understood that the temperature of the griddle plate 22 will be reduced when cold foods are placed on the griddle plate for frying.

Referring again to FIG. 2, it is seen that a notch 58 is formed in one of the copper plates 34. The purpose of the notch is to receive a draw-off tube, for removing fat and grease from the griddle plate 22. Since the griddle plate is unitary with its walls 24, an opening for the draw-off tube can be placed in the arcuate portion 26 of the juncture of the walls and plate 22. This is not possible where the griddle plate is welded to the walls at the juncture. The draw-off tube passes through the notch 58, and the grease can be collected below the griddle plate assembly. As described in further detail in U.S. Pat. No. 5,553,531, the griddle plate and its associated walls can be tilted in order to permit the removal of the fat and grease that has accumulated on the griddle plate.

Figure 4:
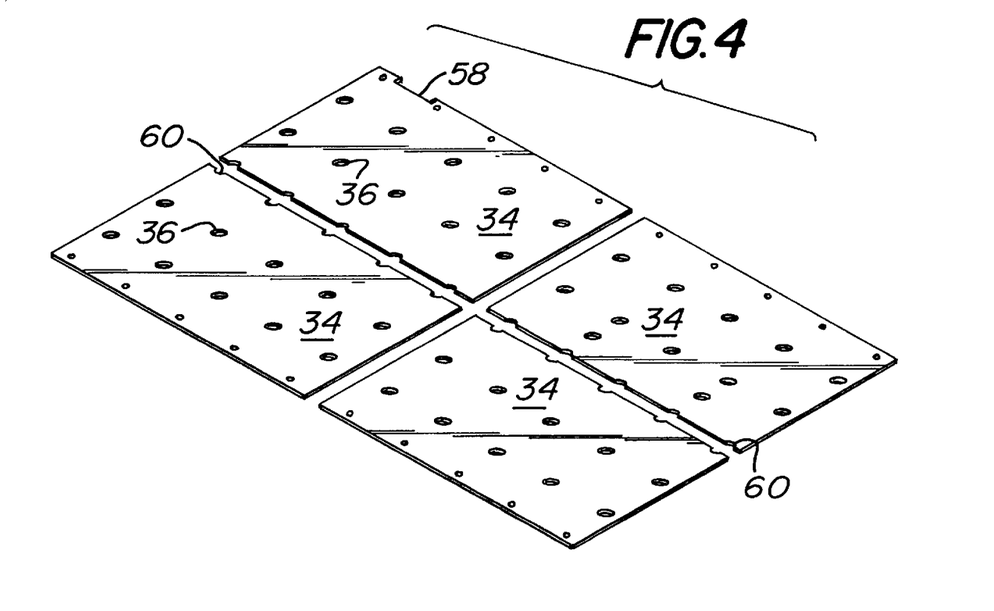
FIG. 4 is a perspective view of the copper plates used in a larger size of the griddle of FIG. 1.

The plates 34 are shown in FIG. 4. As seen in FIG. 2, there are five laterally extending rows of threaded rods 32. The openings in the plates 34 through which the rods pass are shown at 36 in FIGS. 2 and 4. The abutting edges of plates 34 contain semicircular notches 60, which when placed against the underside of griddle plate 22 form circular openings when the plates abut. The center row of threaded rods 32 passes through the openings formed by the abutting plates.

Figure 3:
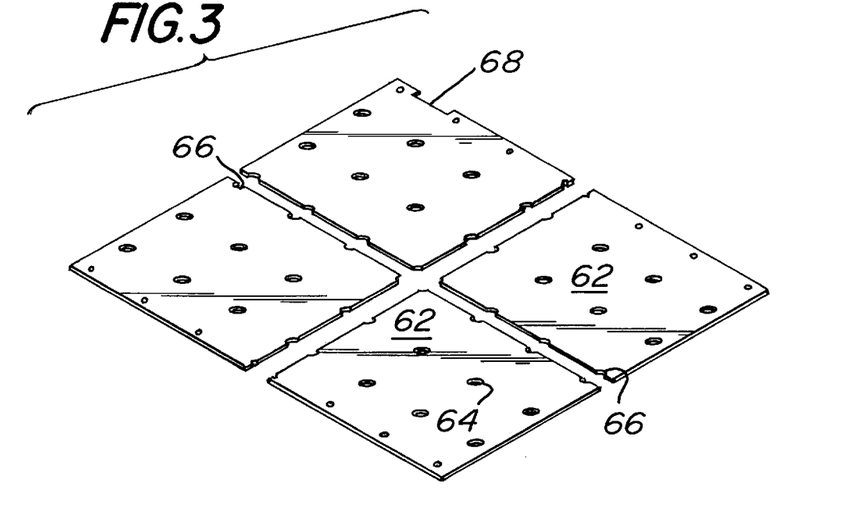
FIG. 3 is a perspective view of the copper plates used in one size of the griddle of FIG. 1.

When a smaller griddle plate 22 is used, the copper plates will also be reduced in size. The smaller copper plates are shown at 62 in FIG. 3. Plates 62 are identical to plates 34, except for their size. Thus, plates 62 contain aligned rows of opening 64, semicircular notches 66 and a notch 68 for receiving the draw-off tube.

The thickness of the copper plates and the thickness of the U-shaped bars 38 can vary, as would be obvious to one skilled in the art. In the present embodiment of the griddle, the thickness of the plates 34 is 0.93 ", the thickness of the U-shaped bars is 0.125" and the thickness of the leaf springs is 0.125".

The embodiment of the griddle of this invention in which an electrical heating source is used is shown in FIGS. 5 to 9. The electrically-heated griddle is generally shown at 70 in FIG. 5. Device 70 includes a stainless steel griddle plate 72 having side walls 74 extending perpendicularly thereto. As with griddle 20, the side walls 74 and plate 72 are formed from a single sheet of stainless steel, and include an arcuate bend 76. The mating edges of the walls 74 are welded together, but there is no weld between the bottoms of the walls and the plate 72. As with griddle 20, having the arcuate bend permits the placement of the draw-off tube at the lower edge of the griddle, thereby enabling complete removal of all fat, grease and other cooking remains from the surface of the griddle plate.

Figure 5:
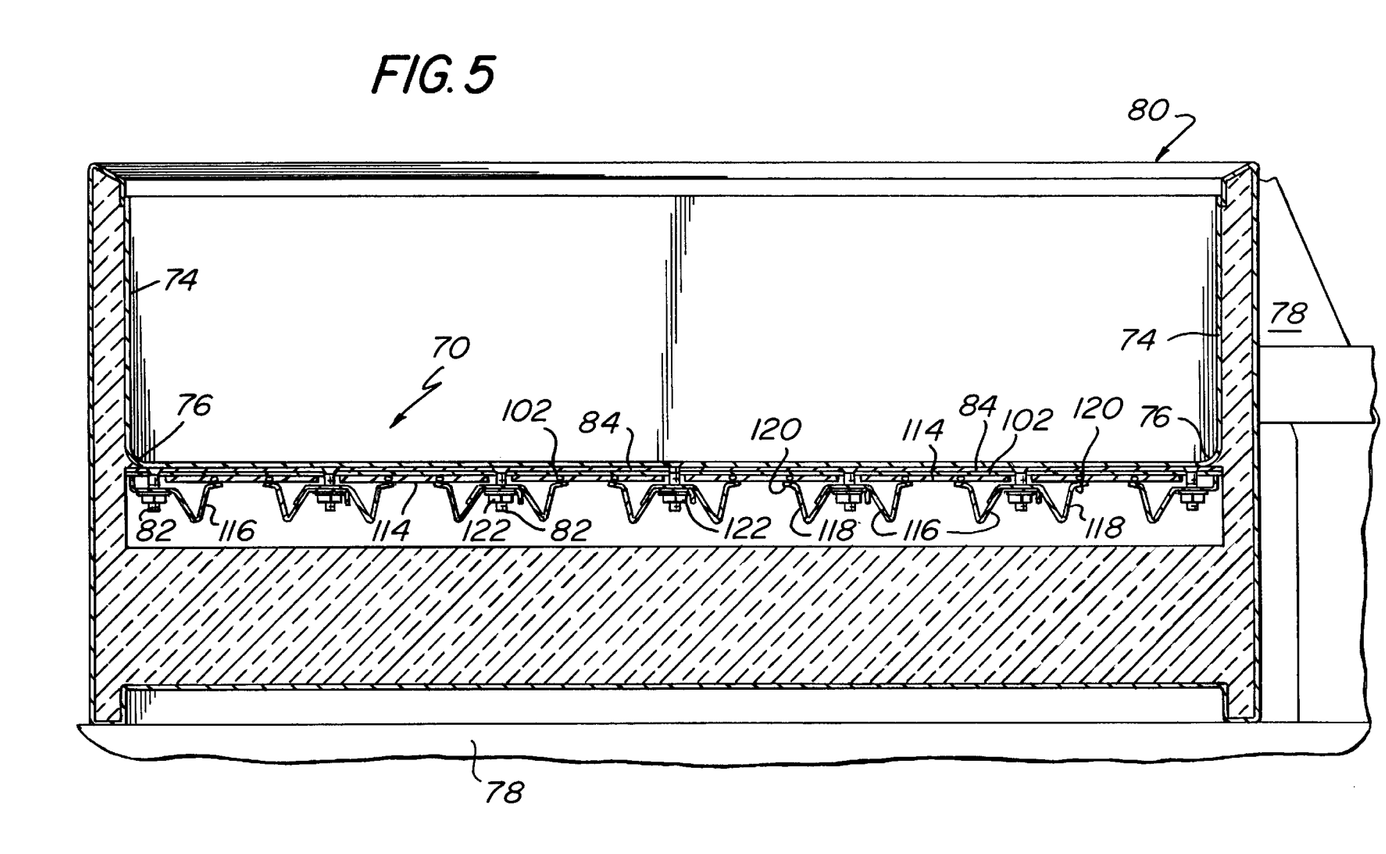
FIG. 5 is a sectional view of a second embodiment of the griddle of this invention.

The griddle 70 is supported on a frame 78, such as that shown in U.S. Pat. No. 5,553,531. The griddle 70 is maintained within an insulated housing 80. The bottom of housing 80 differs from the embodiment of the invention shown in FIG. 1, in that no space is necessary for a gas-fired burner. Instead, the griddle is electrically heated, and the insulation is placed in close proximity to the electrical heaters, as seen in FIG. 5.

Figure 6:
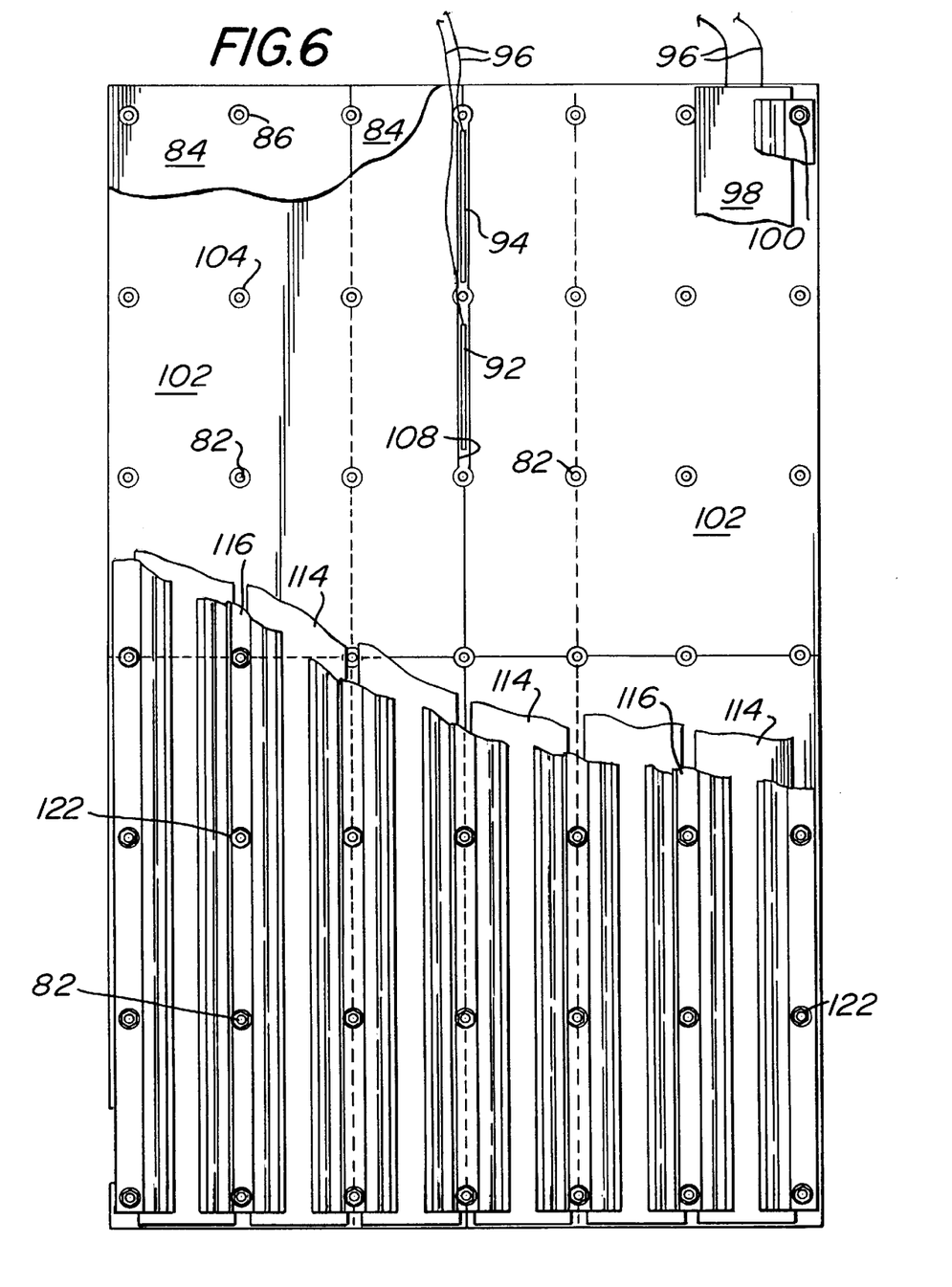
FIG. 6 is a bottom plat view, partly broken away, of the griddle of FIG. 5.
Figure 7:
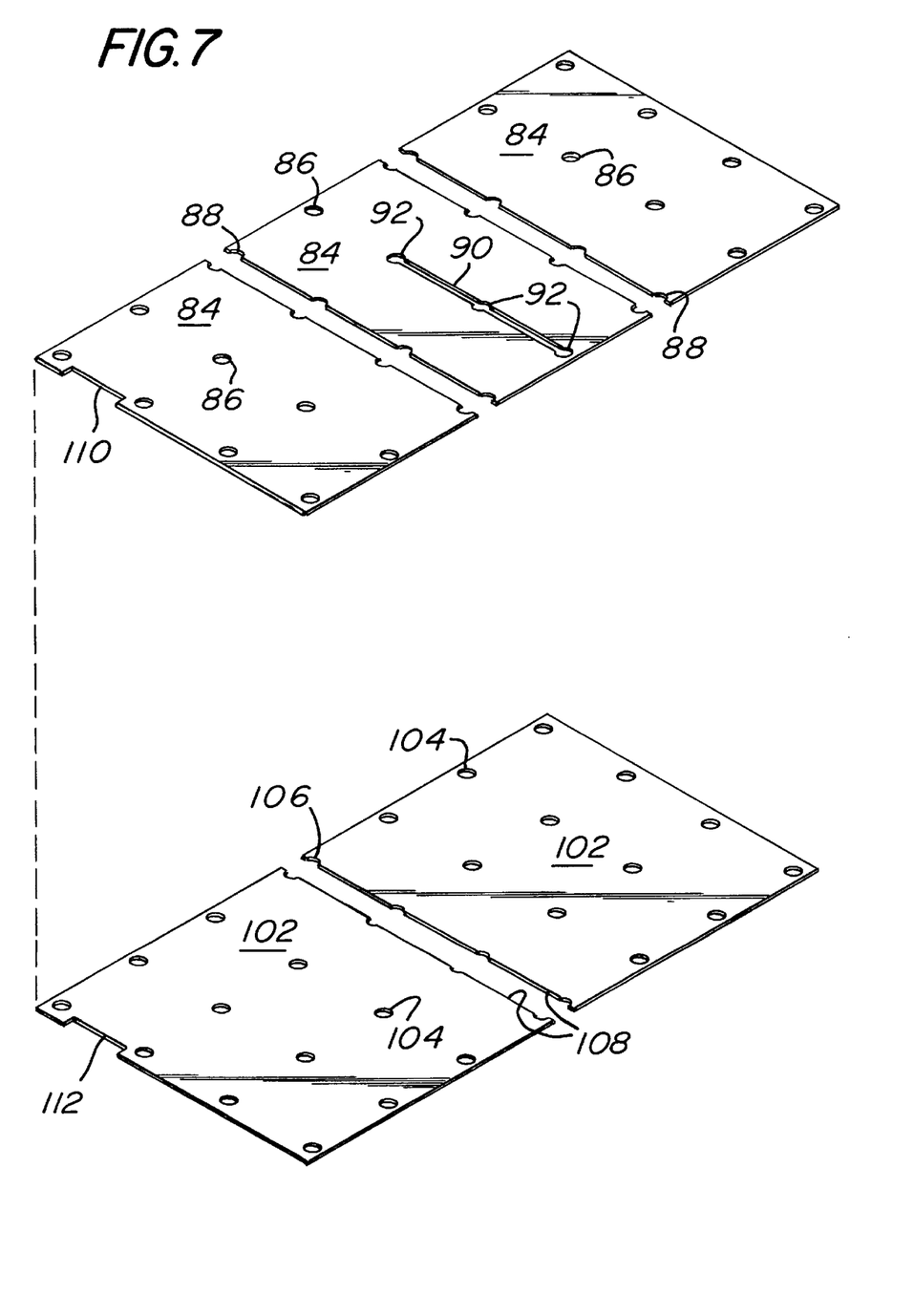
FIG. 7 is an exploded perspective view of the copper plates used in one size of the griddle of FIG. 5.

A plurality of threaded rods 82 project downwardly from the underside of griddle plate 72. As seen in FIG. 6, the rods 82 are spaced, and are transversely and laterally aligned, thereby forming parallel rows. A first layer of copper plates 84 (best seen in FIGS. 6 and 7) abuts the underside of stainless steel griddle plate 72. As seen in FIG. 7, each of the copper plates has a plurality of openings 86 therein, through which the threaded rods 82 pass. Semicircular notches 88 are formed in the edges of plates 84, so that when the plates are positioned against the griddle plate 72, the edges of the plates will abut, and the semicircular notches 88 will form circular openings.

One of the plates 84 includes an elongated slot 90 (FIG. 7). Slot 90 includes enlarged portions 92, through which the threaded rods 82 will pass. As seen in FIG. 6, a primary thermostat 92 and a high-limit thermostat 94 are positioned within slot 90. Leads 96 from the thermostats 92 and 94 are connected with control box 98. A control knob 100 controls the temperature of the griddle plate. The details and circuitry for controlling the temperature of the griddle plate are the same as those described in U.S. Pat. No. 5,553,531, and the controls are of a type well known in the art.

Referring again to FIGS. 6 and 7, a second set of copper plates 102 is positioned below plates 84. Plates 102 have a plurality of openings 104, which are aligned with the openings 86 in plates 84. Semicircular notches 106 are formed in the edges of plates 102, so that when the plates mate, circular openings are formed. The edges of two of plates 102 that will abut have recesses 108 formed therein. The recesses are for the purpose of accommodating the thermometers 92 and 94, as shown in FIG. 6. As seen in FIG. 7, one of plates 84 has a notch 110 and one of plates 102 has a notch 112. When the plates are in the position shown in FIGS. 5 and 6, the notches will be aligned. The draw-off tube, which is placed in an opening in the arcuate edge of plate 72, passes through the aligned notches. As with the embodiment of FIGS. 1 to 4, the draw-off tube is for the removal of fat, grease and other food remains from the griddle.

As seen in FIGS. 5 and 6, in assembling the griddle 70, the plates 84 are positioned against the underside of stainless steel plate 72. The plates 102 are then positioned against the underside of plates 84. As seen in FIGS. 6 and 7, three plates 84 pass across the length of the griddle plate 72. Two plates 102 pass across the length of the griddle plate 72. Accordingly, as best seen in FIG. 6, the abutting edges between adjacent plates 84 are covered by plates 102. The purpose of having the two layers of plates 84 and 102 is to ensure uniform heat conduction across the entire surface of the copper plates. Without the additional layer of plates 102, the seams between plates 84 would prevent good thermal conductivity between the plates. The covering of the seams by plates 102 ensures good thermal conductivity across the entire copper area.

Heat for the copper plates, and the contiguous stainless steel plate 72, is provided by heater bars 114, which extend across the entire width of the copper plates (the bars are broken away in FIG. 6 for the purpose of clarity). Positioned beneath the heater bars are stainless steel leaf springs 116 (FIG. 5). The leaf springs include legs 118 with flared lips 120, which bear against the heater bars 114.

The leaf springs 116 have central openings, through which threaded rods 82 pass. Nuts 122 are tightened against the pressure of leaf springs 116. The leaf springs in turn will hold the heater bars 114, plates 102 and plates 84 in place. The leaf springs extend across the entire length and width of the griddle, and securely hold all of the plates and heater bars in place against the underside of griddle plate 72.

In assembling the structure shown in FIGS. 5 and 6, a coating of high temperature grease is placed on each of the plates 84 and 102, and the heater bars 114, prior to placing them over the threaded rods 82. The purpose of the high temperature grease is to permit the movement of the heater bars and copper plates relative to each other and relative to the griddle plate 72, in the event of significant temperature differentials between the griddle plate and the copper bars.

There is no break in thermal conductivity at the abutting edges of the plates 84, in view of the overlap of the seams by the plates 102. The high temperature grease will also permit movement of the copper plates 102 relative to the heater bars 114.

Further details on the heater bars and their electrical connections can be found in U.S. Pat. No. 5,553,531. The griddle 70 can be tilted for drawing off fat, grease and food remains in the same manner as griddle 20. The structure for tilting the griddle is described in detail in U.S. Pat. No. 5,553,531. Even where the griddle is not tiltable, the fat, grease and food remains can be scraped from the upper surface of griddle plate 72, and removed through the draw-off tube.

Figure 8:
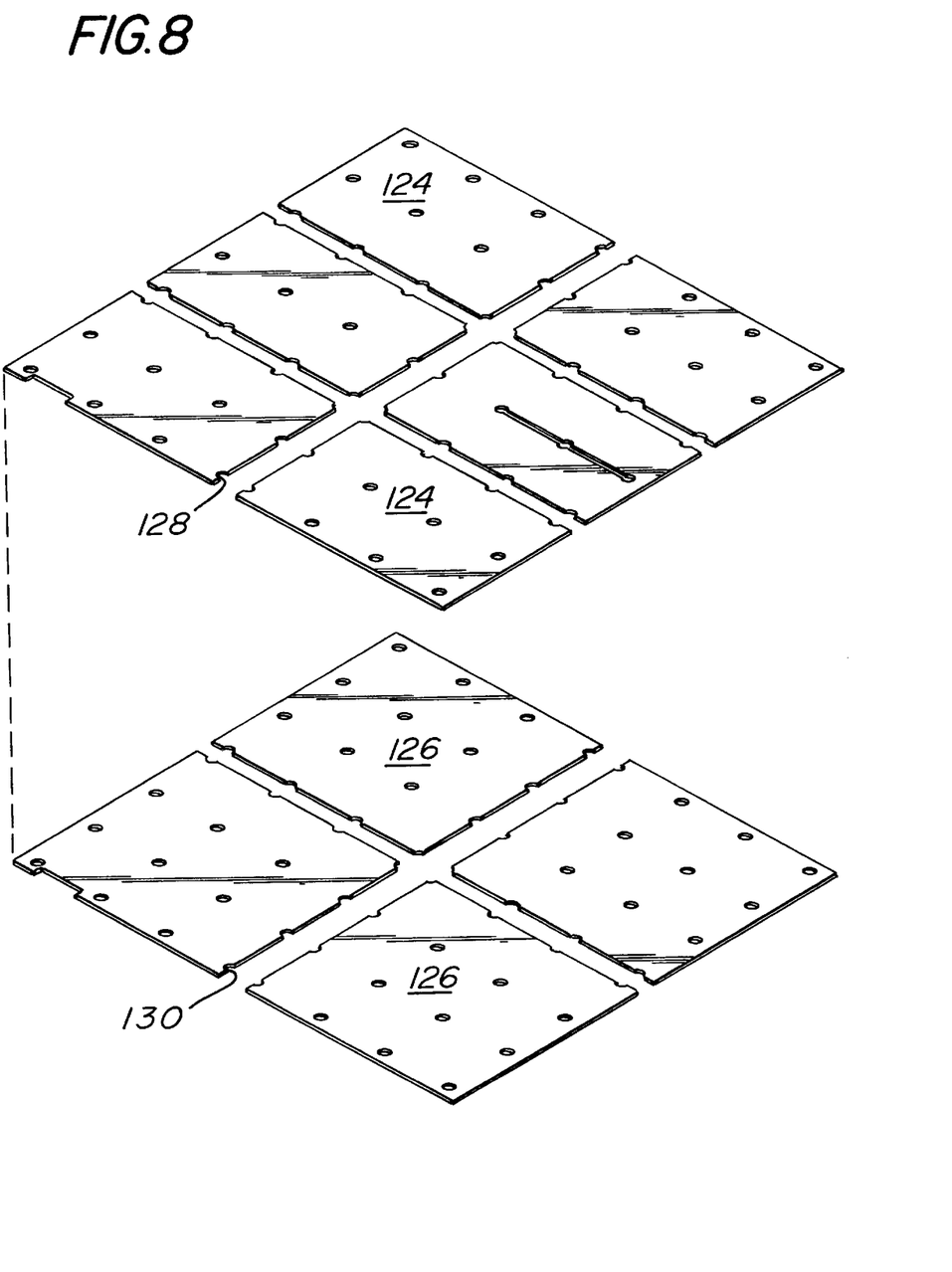
FIG. 8 is an exploded perspective view of the copper plates used in a second size of the griddle of FIG. 5; and, FIG. 9 is an exploded perspective view of the copper plates used in a third size of the griddle of FIG. 5.

FIG. 8 shows the copper plates to be used wherein the griddle plate 72 is smaller in size than those which will be used with the plates shown in FIG. 7. The embodiment of FIG. 8 includes upper copper plates 124 and lower copper plates 126. With the exception of the fact that the plates of FIG. 8 are smaller than those of FIG. 7, the plates are otherwise the same in structure and function, and include the openings, the thermostat slots and the draw-offnotches. However, in the embodiment of FIG. 8, the inner lateral edges of the plates have semicircular notches 128 and 130, which mate to form circular openings.

The plates of FIG. 8 are used in exactly the same manner as the plates of FIG. 7. When assembled against the underside of griddle plate 72, the plates 126 will cover all of the seams of the plates 124, thereby ensuring good thermal conductivity.

Figure 9:
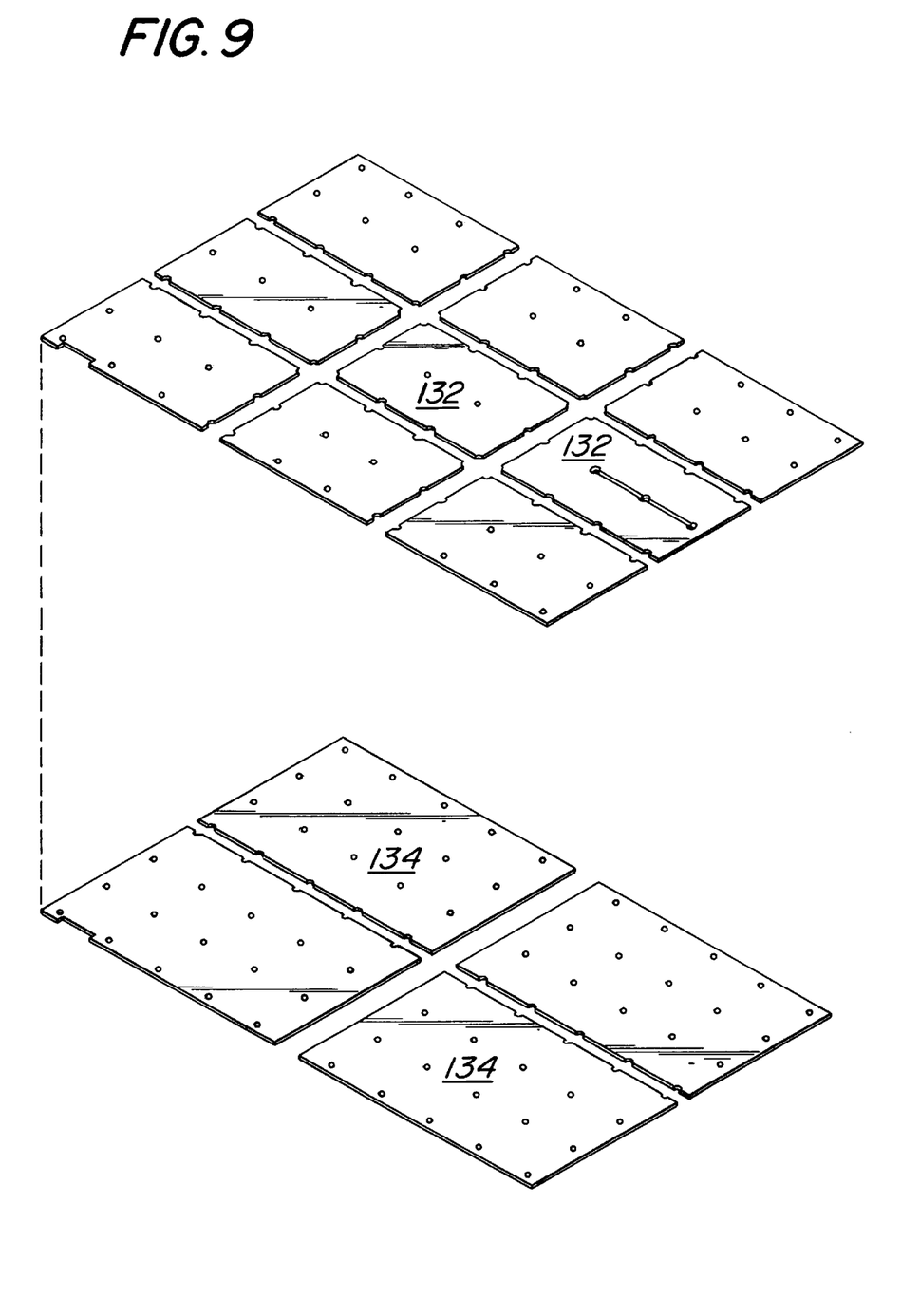

In FIG. 9, sets of copper plates 132 and 134 are shown. These plates are the same in structure and function as plates 84 and 102 of FIG. 7. However, plates 132 and 134 are used to cover a larger area than plates 84 and 102. Plates 132 and 134 include the openings, semicircular notches and draw-off notches of plates 84 and 102. In assembling the copper plates of FIG. 9, all of the seams between plates 132 will be covered by plates 134, thereby ensuring continuous thermal conductivity, in the manner described above.

The thickness of the copper plates used in the embodiment of the invention shown in FIGS. 5 and 6 can vary, and can readily be determined by one skilled in the art. It has been found that a thickness of 0.93" is effective in carrying out this embodiment of the invention.

The use of the copper plates in combination with the stainless steel griddle plate provides excellent heat transfer. Having the copper plates in thermal connection with the stainless steel plate, without having the copper bonded directly to the stainless steel, prevents any warping or bowing of the griddle when it is heated. Any temperature differential between the stainless steel and the copper plates, which results in different thermal expansions, can be accommodated by the movement of the copper plates relative to the stainless steel, which is facilitated through the use of the high temperature grease. The high temperature grease also provides efficient heat transfer between the copper plates and between the copper plates and the stainless steel plate. The use of the leaf springs ensures continuous physical contact between the copper plates and the stainless steel, and between the copper plates themselves, in the case of the embodiment of the invention shown in FIGS. 5 to 9.

Without further elaboration, the foregoing will so fully illustrate this invention that others may, by applying current or future knowledge, readily adapt the same for use under various conditions of service.

I claim:

1. A griddle comprising a griddle plate formed from stainless steel and a plurality of copper plates held against the underside of said griddle plate, said plurality of copper plates being co-planar and said plurality of copper plates covering substantially the entire underside of said griddle plate, said griddle plate adapted to receive food that is to be heated, and further including a plurality of heat conductive bars with each of said heat conductive bars extending across at least two of said copper plates.

2. The griddle of claim 1 wherein said heat conductive bars are formed from copper.

3. The griddle of claim 2 wherein said heat conductive bars are urged against said copper plates by spring means.

4. The griddle of claim 3 wherein said spring means comprise copper leaf springs.

5. The griddle of claim 1 wherein high temperature grease is positioned between the upper surfaces of said heat conductive bars and the lower surfaces of said copper plates.

6. A griddle comprising a griddle plate formed from stainless steel and a plurality of copper plates held against the underside of said griddle plate, said plurality of copper plates being co-planar and said plurality of copper plates covering substantially the entire underside of said griddle plate, said griddle plate adapted to receive food that is to be heated, and further including a second plurality of copper plates, said second plurality of copper plates being co-planar and being positioned against the underside of the first plurality of copper plates, said first plurality of copper plates having seams between the edges of adjacent copper plates, said second plurality of copper plates having seams between the edges of adjacent plates, with the seams of said second plurality of plates being out of alignment with the laterally extending seams of said first plurality of plates, whereby heat can be transmitted from second plurality of plates to said first plurality of plates to said griddle plate, without interruption at seams.

7. The griddle of claim 6, and further including a plurality of electric heater bars positioned against the underside of second plurality of copper plates.

8. The griddle of claim 7 wherein said electric heater bars extend laterally across said second plurality of copper plates.

9. The griddle of claim 8, wherein said electric heater bars are urged against said second plurality of copper plates by spring means.

10. The griddle of claim 9, wherein said spring means comprise leaf springs.

\* \* \* \* \*